June 17, 1969   J. D. RUFF ETAL   3,449,922
CENTRIFUGAL COMPRESSOR AND WIDE RANGE OF CAPACITY VARIATION
Filed Feb. 1, 1967    Sheet 1 of 3

INVENTORS
John D. Ruff
Phillip R. Wheeler

CAPACITY TABLE
(CAPACITY = MOTOR HORSEPOWER DEVELOPED)

| STAGE | CUT-IN POINT F° | SYSTEM CAPACITY | UNIT 20 | | UNIT 21 | |
|---|---|---|---|---|---|---|
| | | | FREQUENCY | % CAPACITY | FREQUENCY | % CAPACITY |
| S1 | 10 | 100% | 480 Hz. | 100% | 480 Hz. | 100% |
| S2 | 20 | 70% | 420 Hz. | 70% | 420 Hz. | 70% |
| S3 | 40 | 40% | 360 Hz. | 40% | 360 Hz. | 40% |
| S4 | 70 | 20% | 360 Hz. | 40% | OFF | OFF |
| S5 | 70 | HEAT/COOL CHANGEOVER | | | | |
| SETTLING DOWN | | 12% | 240 Hz. | 12% | 240 Hz. | 12% |

INVENTORS
John D. Ruff
Phillip R. Wheeler

INVENTORS
John D. Ruff
Phillip R. Wheeler

United States Patent Office 3,449,922
Patented June 17, 1969

3,449,922
CENTRIFUGAL COMPRESSOR AND WIDE RANGE
OF CAPACITY VARIATION
John D. Ruff, 206 Birch St., and Phillip R. Wheeler,
209 W. Pine St., both of Alexandria, Va. 22305
Filed Feb. 1, 1967, Ser. No. 613,271
Int. Cl. F25b 13/00, 39/04, 43/00
U.S. Cl. 62—160                                    12 Claims

ABSTRACT OF THE DISCLOSURE

This invention is an electrically driven heat pump, with heating and cooling cycles and using small centrifugal compressors. A wide range of capacity variation is achieved by the use of a variable frequency power supply. This enables the compressor speeds to be varied so that the various degrees of summer and winter temperature can be matched by an appropriate application of system power.

---

The object of this invention is to produce a heat pump/air conditioner of suitable capacity for an average size dwelling, or small commercial installation, having a large capacity for heating by the highly efficient heat pump method, yet still being efficient at the much lower capacity needed for cooling operation. An examination of heating/cooling load requirements shows that an average size dwelling can be cooled satisfactorily with a 3 H.P. system but that at 10 degrees F. a heat pump would need to have a capacity of 15 H.P. to heat the same dwelling.

Current practice with residential heat pump applications would be to use a 5 H.P. unit for the above mentioned dwelling; which would be more than adequate for cooling purposes, but would only be suitable for heating at temperateures of 40 degrees F. or more. At temperature lower than this the heat pump would cease to function and heating would be provided by electrical resistance elements which are in the region of 250% more costly to operate. This type of system is very suitable in temperate regions where the temperatures do not go below 40 degrees F. very often or for very long periods. However, in the colder regions this type of system has been found to be unsatisfactory generally. And, if a larger compressor of the conventional reciprocating type be used for the heat pump it is found to be quite cumbersome and costly and inclined to have lubrication problems, poor volumetric efficiency, and unsatisfactory mechanical reliability as compared to a centrifugal compressor when used at low outside temperatures.

Conventional centrifugal compressors are generally quite expensive and not smaller than 50 H.P. but this invention uses a high frequency electrical supply to the motor so that the impeller speed can be increased and the impeller diameter reduced and so a smaller and relatively simpler compressor of about 20 H.P. can be produced at reasonable cost, while still retaining the advantages of high efficiency and superior reliability associated with this type of compressor.

This invention comprises:

A heat pump/air conditioner using centrifugal compressors.

A compressor system using two, two stage centrifugal semihermetic units, each unit being driven by a variable speed, high speed induction motor, so that the capacity of the system can be variable over a wide range.

Methods of automatic speed selection and capacity control for the compressor system so that system performance is governed by the outside ambient temperature.

A means of limiting the electrical current drawn from the supply circuit during start up of the motors.

A system of condensers, flooded evaporators and refrigeration components arranged and constructed so that the heat pump capacity can be several times that of the air conditioning capacity, and variable.

A system of inside coils in two parts, one part of which, during the air conditioning function becomes the flooded evaporator and the other a storage receiver for excess refrigerant, the two parts together being the heat pump function condenser.

A method of arranging the compressor units so that the refrigerant vapor cools the windings of both motors in the same sweep, so that the pressures around all the motor shaft bearings and throughout the lubrication system essentially are the same.

A system of lubrication for the motor shaft bearings.

A system of recovering oil absorbed into the refrigerant.

Methods for preventing carryover of liquid refrigerant from the evaporators into the compressors, due to excessive evaporation.

Compressors

A four stage compressor is used in this invention and provision made for shutting down two stages during the cooling function when a much lower compression ratio is needed. The compressor stages in fact are constructed in two separate units, 20 and 21. These units are mounted in two interconnected semihermetic enclosures, 50 and 51. Each of the units, contains a central squirrel-cage motor with a centrifugal stage at each end of its shaft. An additional means of adjusting the capacity of the system is to change the frequency of the electrical supply to the motors. A typical range of operating capacities of the system is from 4 H.P. in cooling function with two stages of compression at reduced speed, to 20 H.P. in heat pump function with four stages of compression at full speed.

Frequency converter

Figure 1:
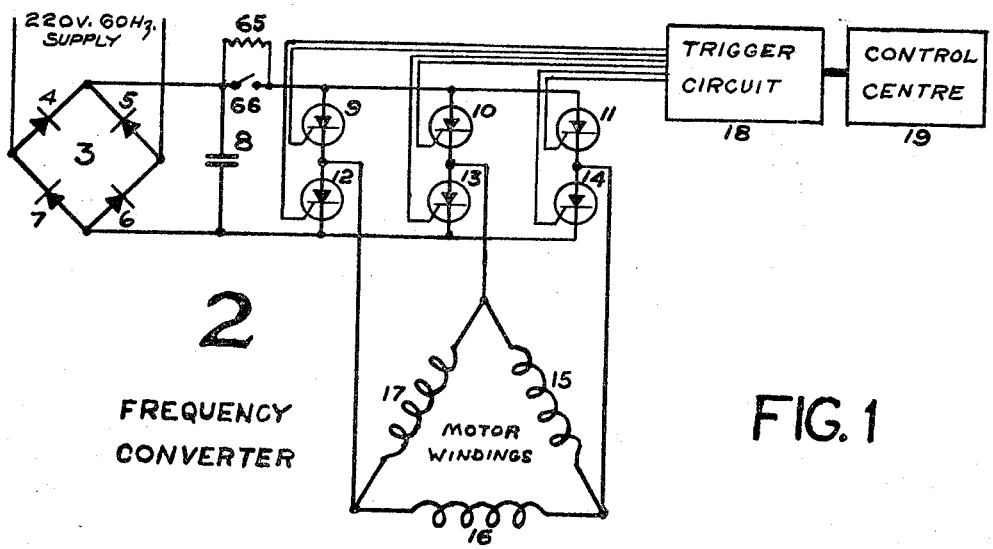
FIG. 1 is a wiring diagram of a suitable frequency converter.

FIG. 1 illustrates a high frequency converter of typical specifications for supplying power to the compressor motors. There is a converter for each motor. The 220 v. AC, 60 hertz (cycles per second) supply is first rectified by the bridge rectifier 3 using solid state diodes 4, 5, 6, 7. This pulsating DC output is smoothed by filter capacitor 8 and fed to the silicon controlled rectifiers 9, 10, 11, 12, 13, 14 which switch into the three phase motor windings, 15, 16, 17 of one of the motors. Some filtering may be necessary at the windings to achieve optimum wave shape and can be provided as needed. The firing of the silicon controlled rectifiers 9, 10, 11, 12, 13, 14 is controlled by the variable frequency phase sequencer 18. There is only one such sequencer and it controls both converters. This circuit triggers and turns off the silicon controlled rectifiers in the necessary sequence for a three phase operation. The frequency of the resulting three phase supply is variable by changing the frequency of the sequencer oscillations. A typical arrangement is to have three steps of variation with 12½ increments. A typical range of operating frequencies is 360 hertz, 420 hertz and 480 hertz. The control and selection of these steps originates in the control centre 19. By this method the speeds of rotation of the compressor motors of 20, 21 are controlled since these motors are of the squirrel cage induction type and their speed is dependent on supply frequency. Since the capacity of a centrifugal compressor varies basically as the cube of the rotation speed then the operating capacity of each compressor will be approximately 40%, 70% and 100% of full speed capacity, at the three steps of modulation. (See FIG. 3.)

There are several methods of achieving the frequency conversion to control motor speed but an electronic converter as described above is preferred since the necessary frequency changes can be accomplished simply by changing the frequency in the trigger circuit. Details of such a circuit are not shown for the sake of simplicity but such circuits are often used in three phase converters and inverters. Although a variable frequency trigger circuit is less common, such variations can readily be obtained by varying the values of certain resistors and capacitors in the frequency oscillator. However, a motor/generator set or any other type of variable frequency converter can be used as an alternative conversion method.

*Automatic capacity control*

Figures 3, 4:
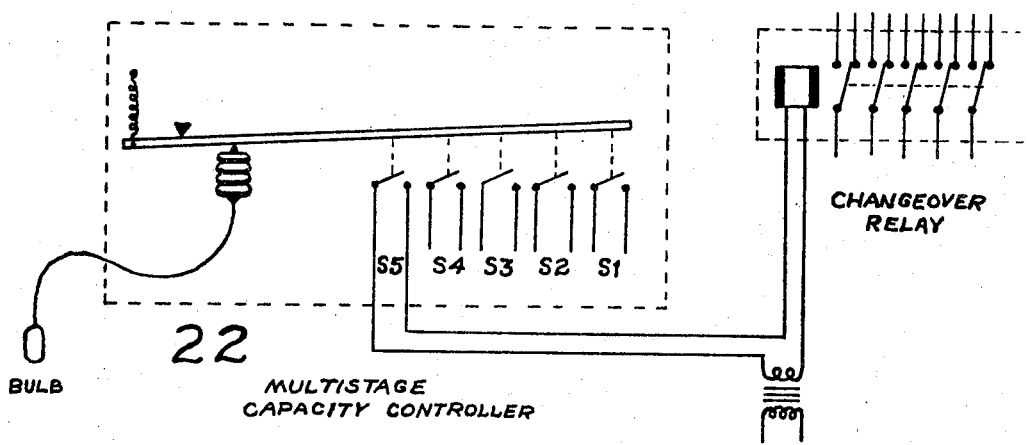
FIG. 3 is a table of compressor capacities.
FIG. 4 is a schematic diagram showing a capacity controller and a system changeover relay.

The various capacity requirements of the heat pump operation are dependent on the outside air temperature, so for overall system capacity control, a multistage capacity controller, 22 in FIG. 4, is placed in the outside air with the switch points of this controller being part of the control centre 19 circuits. For the typical capacity steps above, the capacity controller has five stages and a typical range of capacities is shown in FIG. 3. Each stage may have an adjustable cut-in point. The fifth stage controls the automatic changeover from heat pump to cooling operation, through relay 28 (refer to FIG. 4), and the cut-in point occurs at about 70 degrees F. outside temperature though this setting varies, with different applications. An alternative method of capacity variation is to control the speed of the motors over a continuous range of speeds rather than in stages.

*Low current motor starting*

In this invention, precaution is taken to prevent high starting current through the compressor motors. This being particularly important since the present invention is designed for residential use where the electrical supply often does not have high current capacity. Since a centrifugal compressor does not assume its load until it approaches its full speed, load torque at starting is not a problem. The only factor is the momentary inertia of the rotor, shaft and impellers as they pick up speed, and the high current due to the large amount of field slip at the low speeds till full speed is reached. So a current limiting resistor 65 is switched into the converter circuit by opening switch 66 during starting. Switch 66 is controlled by a time delay switch and left open only long enough for the motor to pick up speed. During this time all current through the converter and motor circuit flows through resistor 65 so that if its resistance is about the same as the impedance of the inverter/motor circuit at full load, then the starting current cannot exceed the full load current, even at locked rotor conditions. Such limiting resistors are used in both motor circuits.

*Variable capacity coils*

Figure 2:
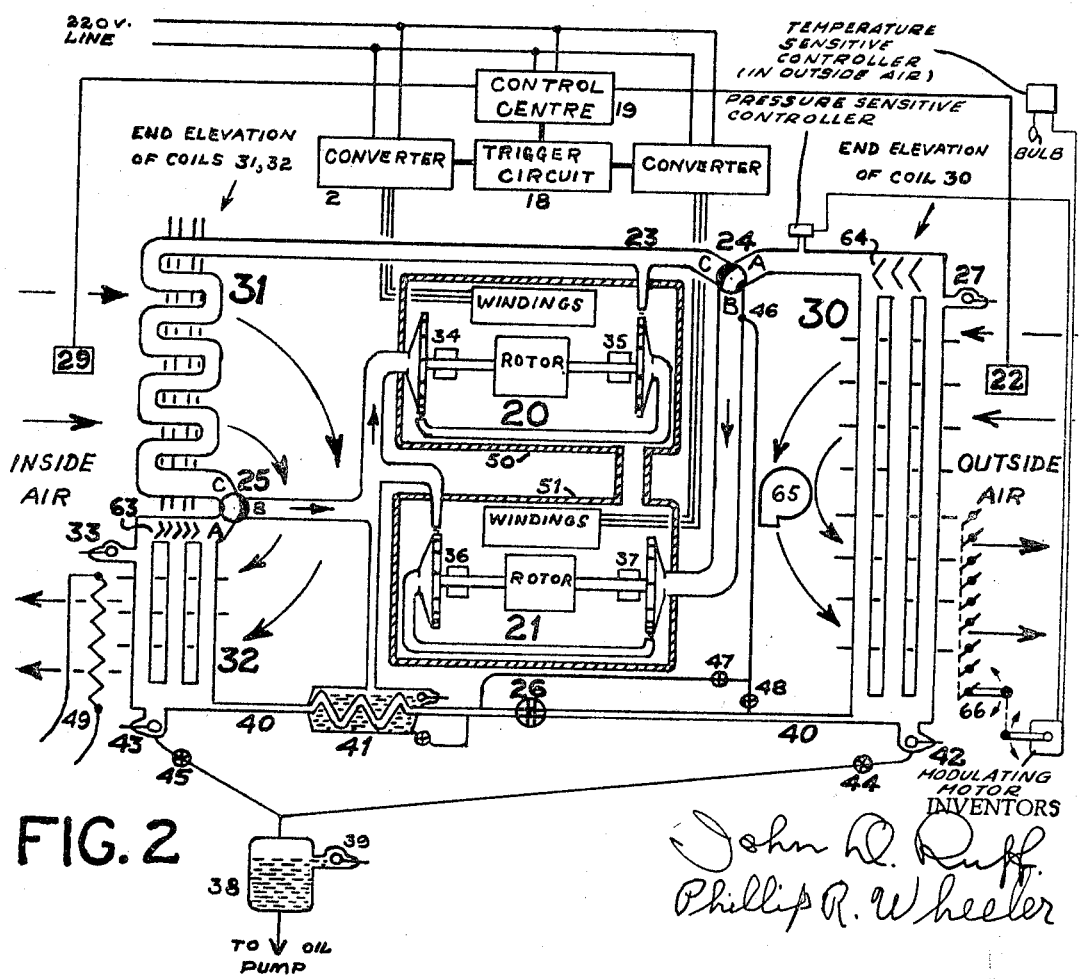
FIG. 2 is a schematic diagram showing general system operation.

In this invention the coil 32 is primarily the cooling coil during the cooling function although it does become part of the system condenser during the heating function, with coil 31 the other part. For this cooling function however, since only two compressor stages are operating and at reduced speed (refer to FIG. 3), coil 32 is proportionally smaller, as shown in FIG. 2, than the cooling coil 30, which is the evaporator when 4 stages of compression are in use and sometimes at full speed. Thus the most efficient cooling coil size is used.

Also in the heating function, in stage S4, when only two compressor stages are in use and at reduced speed, the flow of outside air may be reduced by slowing down the outside air fan 65. This has the same effect as reducing the size of the coil 30. By this method some measure of adjustment is maintained on the temperature of coil 30 when in use as an outside evaporator. Further refinements are, the control of outside air fan 65 over a range of speeds or the use of modulating dampers 66 in the outside air circuit. Such devices may be used in all heating stages. The object being to adjust the evaporation rate in coil 30 to the requirements of the system, over a wide range of outside temperatures. Fan speed, or damper setting is controlled by outside air temperature through a suitable temperature controller.

This invention can be used as either an air to air system as shown in FIG. 2, or as an air to water system if a hydronic circulation system is used. In which case coils 31, 32 are water contacted and not air contacted as shown in FIG. 2. The fluid capacity of coil 30 is the same as coil 31 plus coil 32, and the system is fully charged when it contains enough liquid to fill coil 30 to a little above the level of float 27.

*System operation (heating)*

First an example is taken with an outside temperature of 8 degrees F. Since the controller 22 of FIG. 4 is below 70 degrees F., then the stage S5 switch points will have the system switched to heat pump operation (refer to FIG. 3). That is, the electrically operated changeover valve 24 will be open through ports A–B and electrically operated changeover valve 25 will be open through ports C–A. Also the inside thermostat or controller circuit 29 will be switched to make on drop of temperature. The liquid line solenoid valve 26 will be activated under the control of float switch 27. All these changeover operations will be accomplished by the multipole relay, 28 in FIG. 4, located in the control centre. Then on a drop in the temperature of thermostat 29, it will call for heat, and through the control centre the compressor motors will be started. The capacity controller 22 will cause both compressor motors to run at full speed since at 8 degrees F. the system is in stage S1 capacity (refer to FIG. 3).

The refrigerant circuit in the heating function is as follows. The outside coil 30 is a flooded evaporator and as the refrigerant is boiled off, the coil temperature becomes low, so that heat can be extracted from the outside air. On leaving the evaporator coil the refrigerant vapor is drawn through baffles 64 and open A–B ports of changeover valve 24 and on into the inlet of the low temperature compressor 21 where it is compressed through two stages of compression and discharged into the inlet of the high temperature compressor 20. There will be no flow through port B of control valve 25 since it is in the C–A position, and B port is closed. Compressor 20 compresses the refrigerant through two more stages and delivers this hot gas through line 23 and to the condenser coil 31. The flow is then through ports C–A of changeover valve 25 and into coil 32. Coils 31 and 32 combined, comprise the condenser in the heat pump function and the heat extracted from them provides the heat product to the air going through them; or water if a hydronic circulation system is used. The condensed liquid, at head pressure, travels through the liquid line 40 to the liquid line solenoid valve 26. To maintain the liquid level in coil 30 as the refrigerant is boiled off, float switch 27 causes solenoid valve 26 to open and close as required. When it is open the liquid refrigerant is forced, at head pressure, along the liquid line and into coil 30. When the liquid level reaches float switch 27 the solenoid valve is turned off, In stage S2 capacity (see FIG. 3) there is no change in the refrigerant circuit only a 12½% slow down of the compressors. In stage S3 capacity a further 12½% slow down. However, in stage S4 the low temperature compressor 21 is stopped and the refrigerant vapor flows through it unaided.

In the heating function when both compressor units are operating, in stage one, two and three, use can be made of a flash type liquid intercooler 41. This device is frequently used on multistage compressor systems. Its purpose is to give the system a little better efficiency.

An electric resistance heating element 49 is placed in the discharge air flow. This can be used as a standby heating method in case of system failure and it also is a part of the defrost system.

The method of defrosting the outside coil 30 during heat pump operation is the conventional method of system reversal which is simply a matter of actuating changeover relay 28. However since this causes coil 32 to become a cooling coil and to deliver uncomfortable cool air into the space, then the heating element 49 is turned on during defrost, to neutralize the cooling effect. Of course during defrost, the outside air fan is stopped but the inside air fan is left running. Control of defrost is by conventional means. With a hydronic circulation system the heating element is not needed for defrost since available heat is found in the circulating water. Actually the water circulating pump is stopped during defrost.

In atuomatic changeover from heating to cooling with the hydronic circulation system, a limiting thermostatic controller must be used to hold back the changeover till the circulating water temperature has dropped sufficiently.

*System operation (cooling)*

As stage S5 of the multistage controller 22 is reached at about 70 degrees F. the changeover relay 28 is activated and the system is changed over to cooling function. That is the changeover valve 24 is open through ports C–A and the changeover valve 25 is opened through ports A–B. Also the inside thermostat control circuit will be switched to make on rise of temperature. The liquid line solenoid valve 26 will be activated under the control of float switch 33. Then on a rise in the temperature of thermostat 29 it will call for cooling and through the control centre the high temperature compressor 20 will be started. The low temperature compressor 21 is normally not used in the cooling function and the high temperature compressor needs to run at only its lowest capacity unless there is a heavy heat load when it could be set to run at higher capacity.

At the point of changeover most of the refrigerant in the system will be in the flooded coil 30. However in the cooling function this coil is to become the condenser. So when the compressor starts after changeover, head pressure is developed in coil 30. This causes the liquid to flow through the liquid line 40 to coil 32 which now becomes the flooded evaporator in the cooling cycle. The float switch 33 is now controlling the liquid flow into this coil by operating solenoid valve 26. However coil 32 is much smaller than coil 30, and when coil 32 is flooded to its operating level at float switch 33, there will still be a large quantity of liquid in coil 30. But the level of this liquid will gradually be dropped to the correct level in coil 30, as refrigerant condenses in coil 31, which will fill with liquid trapped there, since this coil is top fed and the bottom connection is to port C of valve 25 which is closed. This liquid will remain in coil 31 while the system is in cooling function. Thus, the refrigerant charge is balanced in the dual functions of heating and cooling.

The refrigerant circuit in the cooling function is as follows: The inside coil 32 is a flooded evaporator and as the refrigerant is boiled off, the coil temperature becomes low, so that heat can be extracted from the inside air, or circulating water if a hydronic circulation system is used. On leaving the evaporator coil 32 the refrigerant vapor is drawn through the open A–B ports of changeover valve 25, and into the inlet of compressor 20. After two stages of compression the hot gas is discharged into the outside coil 30 which is now acting as the system condenser. The liquid will drain from the condenser 30 into the liquid line 40 and then will flow through solenoid valve 26 and back into evaporator coil 32.

When the outside air temperature is not very high, say 78 degrees F., and the inside air is being maintained at 72 degrees F., there is a tendency to overload the system due to the small compression ratio required and particularly since coil 30 is an oversize condenser. However, if the air flow through condensing coil 30 is reduced, then condensing or head pressure is increased and so the loading on the compressor is reduced. Methods were described earlier for varying the air flow through coil 30 (in heating function) by using a variable speed fan 65 or modulating dampers 66. By these methods the air flow through 30 can now be varied in cooling operation, but under the control of a pressure controller at head pressure, so that a constant and suitable head pressure can be maintained. This arrangement is also very useful when in cooling function at low ambient temperature as in computer rooms where, due to heat loading from electrical equipment, cooling is often needed when outside temperature is below freezing.

In this application (computer room use), however, a manual changeover switch, or an additional inside thermostat stage, replaces the automatic changeover switch (S5 in FIG. 4), since the choice of heating or cooling function depends on whether or not the computer equipment is being used, and not on outside temperature.

*Motor cooling*

Figure 5:
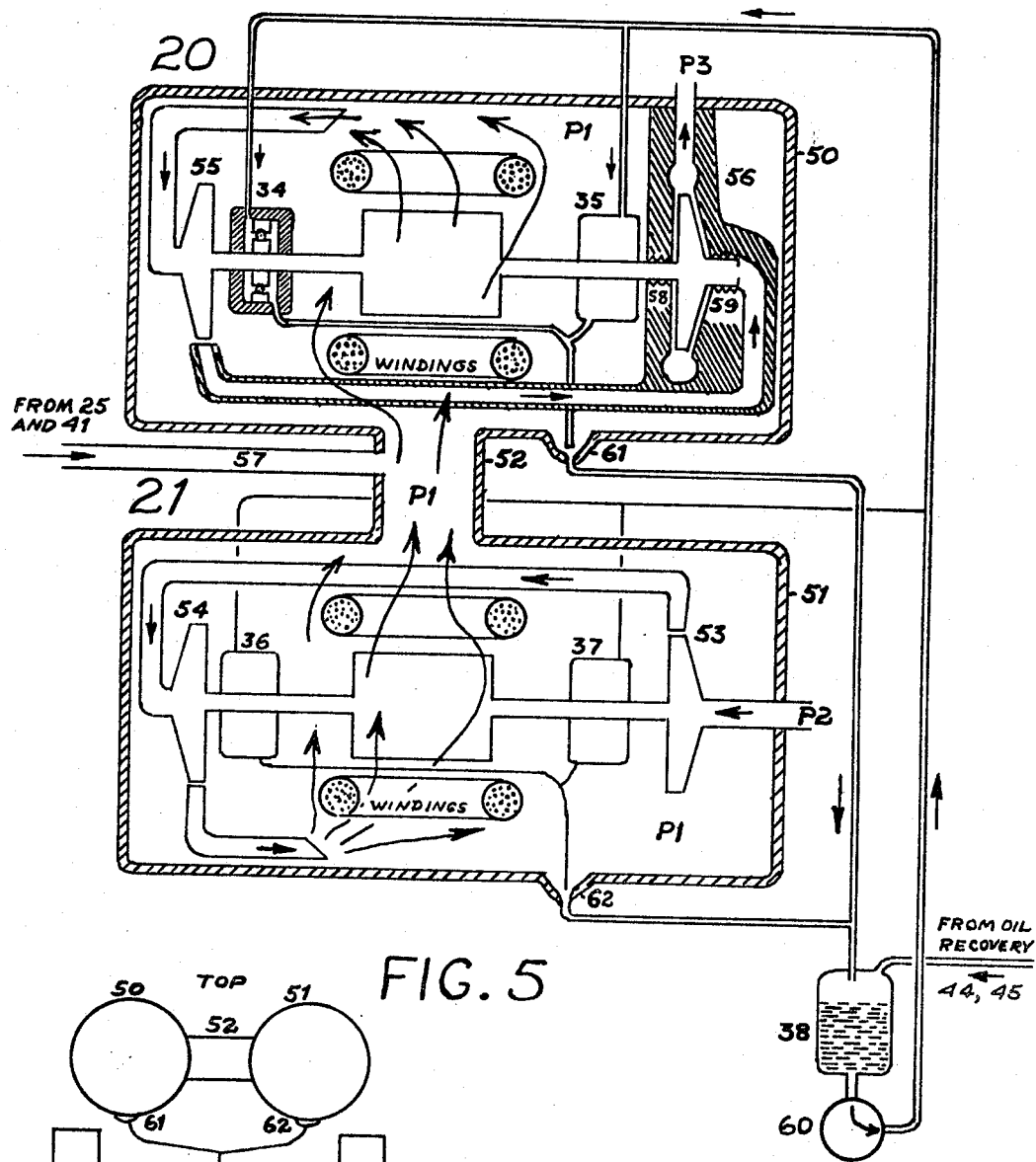
FIG. 5 is a schematic diagram of the compressor units and lubrication system.

FIG. 5 shows particularly, refinements in the compressor units, their semihermetic enclosures, the shaft bearing housings, the lubrication system and the pressures encountered at various parts of the system. Also it shows the path taken by the refrigerant vapor relative to the motor windings for the cooling of these same.

The enclosures 50, 51 are connected by transfer pipe 52 which is of ample size so that the pressure throughout both enclosures is equalized and this pressure is designated P1. The four stages of compression are shown 53, 54, 55, 56 and the pressures within these stages vary from suction pressure P2 to head pressure P3. The transfer of refrigerant vapor from stage 54 to 55 is done by discharging it from stage 54 into enclosure 51 in such a way that it flows over the motor windings of unit 21, then through transfer pipe 52, over the motor windings of unit 20 and into the intake of stage 55. Thus P1 will be the interstage pressure between 54 and 55. When unit 21 is not in the refrigerant circuit, the vapor flows directly into transfer pipe 52 along pipe 57 from changeover valve 25. The labyrinth seals 58 and 59 are indicated on the shaft and intake of the impeller. Each stage has such seals.

*Lubrication system*

The four compressor bearings 34, 35, 36, 37 are each enclosed in a housing, as shown at 34, which has close fitting openings for the motor shaft so that lubricating oil around the bearing tends to stay within the housing rather than flow outwards from the bearing along the shaft. These close fitting openings have spiral grooves in their bore which tend to keep the oil within the enclosure. The oil pump 60 pumps the oil from reservoir 38 into the housing of each bearing. The oil then drains into the sumps 61, 62 at the bottom of enclosures 50, 51. Any leakage oil from the bearing housing shaft openings also collects in these sumps. Sumps 61, 62 drain back into oil reservoir 38 whose pressure is also at P1.

Figure 6:
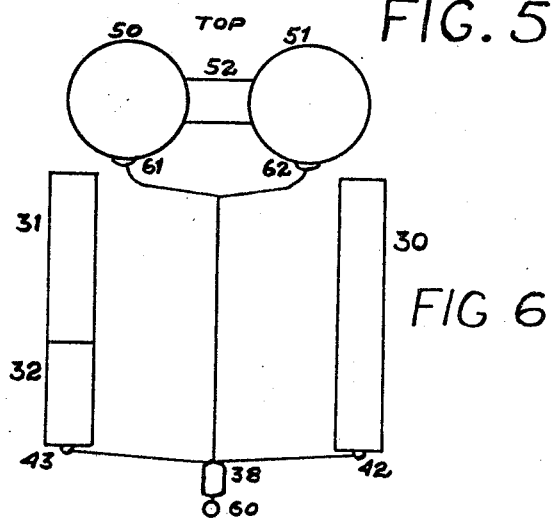
FIG. 6 is a layout of some system components.

FIG. 6 is an end elevation showing the general arrangement of components in the system and showing their positions relative to each other, particularly as it affects levels of liquids, oil and refrigerant.

*Oil recovery*

Since the present invention may be used at shaft speeds of 30,000 r.p.m. and higher, shaft seals of the direct contact type are considered to be impractical. So then the lubrication oil will not be isolated from the refrigerant. Also, the flooded evaporator tends to trap any oil which finds its way into it.

So an oil recovery system is provided in both heating and cooling function (see FIG. 2). When the oil level in reservoir 38 drops below a certain level, float switch 39 activates the oil recovery cycle. A sequence timer controls this cycle. Regardless of whether the system is in heating or cooling function, any oil which is in the refrigerant circuit collects in the flooded evaporator in use. Since the refrigerant is continually boiling off, it will always leave this oil in the evaporator. So then the first step in recovery, is to pump down the evaporator 30 or 32. This is done by interrupting the electrical circuit to the solenoid valve 26 but keeping the compressor running continuously. This causes the liquid to keep boiling off in the evaporator but there is no flow of liquid refrigerant into the evaporator to replace it. This operation is maintained for a preset time which is more than sufficient to boil off all the liquid in the evaporator. At this point compressor operation is stopped and pressure will return to the evaporator being pumped down. Any oil then will be lying on the bottom of the evaporator and covering float switch 42 or 43. The appropriate solenoid valve is then opened; that is 44 is opened when coil 30 is being drained, and 45 is opened when coil 32 is being drained. The selection of which solenoid valve is used, is done by a set of points in heat/cool changeover relay 28 (see FIG. 4). When this solenoid valve is opened the oil will flow into reservoir 38 until the level at either float switch 42 or 43 is dropped. Then the oil recovery cycle is terminated, the solenoid valve 44 or 45 is closed, the valve 26 is reactivated and the compressor starts.

Since these compressors are semihermetic and depend on a flow of refrigerant vapor over the motor windings for cooling purposes, then, while the evaporator is being pumped down there is a tendency toward overheating due to reduced gas flow, particularly, as the last portions of liquid refrigerant are being removed from the oil. So a small flow of liquid refrigerant is introduced into the suction line at 46 by opening solenoid valve 47 or 48. Choice of 47 or 48 is also controlled by changeover relay 28. This provides enough vapor to keep the motor windings cool.

*Liquid carryover prevention*

When the compressors are starting up on demand from the inside thermostat, after being shut down for some time, trouble can be encountered with excessive boiling off of liquid refrigerant in the evaporator. This occurs in both heating and cooling functions. As a result, a frothing and expansion of the body of liquid may occur with the danger that some of this liquid may be carried into the compressor, where it may cause damage. In FIG. 6, the compressor units are shown at a level higher than the cooling coils. This arrangement gives a most efficient means of preventing refrigerant liquid from entering the compressors, but it is not the most compact arrangement. The compressors can be mounted lower and some loops made in the piping to prevent liquid carryover, but this will cause some loss in operating efficiency. Either method however can be used. In FIGS. 2 and 5 the compressors are shown one above the other. This arrangement would be suitable if they were mounted low, between the coils. However, if they were mounted high as in FIG. 6 the side by side arrangement would be more suitable. Either arrangement can be used. The excessive boiling off mentioned, is caused by the rise in temperature of the evaporator liquid while the system is stopped, and the dropping in temperature of the condenser. In both heating and cooling, the evaporator is in an environment which is warmer than its operating temperature so that a rise in temperature is unavoidable during the off cycle. So then, when the compressors start there is an availability of heat, for vaporization, which is greater than that available when the system has been running for some minutes and "settled down." Also the condenser pressure is low, causing an increased flow through the compressor. These things cause the excessive boiling. Eliminator baffles 63 and 64 at the top of each evaporator help to deflect this frothing liquid away from the compressor lines during this or any other sudden change in load. However as a further precaution, when the compressors are started they are run at reduced speed for a time, and with the evaporator fan stopped. The time of this operation is preset and controlled by a timer. This allows the evaporator liquid to be cooled to operating temperature (or lower) before exposing the liquid body to the full suction capacity of the compressors.

Turning off of the condenser fan for some time prior to the application of full compressor capacity also helps reduce excessive flow through the compressor by building up head pressure in advance. With a hydronic circulation system there is no inside fan to shut off, but the water passing through the coils keeps a fairly even temperature, and so stabilizes the temperature of the coils 31, 32 in their function as a condenser, and coil 32 as an evaporator. This "settling down" speed is achieved by controlling the frequency in the trigger circuit 18, and a typical settling down frequency is shown in the table in FIG. 3. Another method is to approach the running speed with a gradually increasing speed rather than a fixed settling down speed.

For example: the compressor motor could be started with a trigger frequency of 200 hertz, which would then gradually increase to the operating frequency of 360 hertz, 420 hertz or 480 hertz. Such increase may take five minutes or longer. Similarly capacity changes from stages S3 to S2 to S1 would be accomplished gradually. A change from S4 to S3 would be made by dropping the frequency back to 200 hertz, then starting compressor 21 (compressor 20 would be already running) and then slowly increasing the frequency up to the stage S3 frequency of 360 hertz.

The choice of 200 hertz is only for an example. In an actual design this frequency would be chosen carefully as one which will run the compressors at a very low rate of capacity, at the most extreme design conditions; that is, high evaporator temperature and relatively low condenser pressure.

We claim:

1. In combination, a heat pump system including condenser and evaporator and having selective heating and cooling cycles, comprising two, two stage semi-hermetically sealed centrifugal compressors, each driven with a variable speed induction motor, a power supply having a frequency control means for varying the frequency of the power and thus the speed of the induction motors, and temperature sensitive means for selecting the optimum motor and compressor speed relative to the ambient outside temperature.

2. A device as covered in claim 1 above, and means associated with the said temperature sensitive means for selecting the optimum compressor speed, for also converting the equipment to or from either a heat pump or an air conditioning system.

3. A device as covered in claim 1 and temperature sensitive means for shutting down the first two stages of compression, as required for capacity reduction.

4. An equipment as covered in claim 1, and an oil separation and recovery system comprising means for separating the oil from the refrigerant in the evaporator coil by boiling off the refrigerant, the said means including an oil level sensitive device which initiates an oil recovery cycle when the oil level in the oil reservoir reaches a predetermined point, and the said oil recovery means being operable during both the heating and cooling cycles.

5. An equipment as covered in claim 1 and a divided condenser coil means for the heat pump, both parts of the coil means functioning as a condenser during heat pump operation but during air conditioning operation servo operated valve means causing one part to perform as an evaporator and the other as a storage condenser for excess refrigerant.

6. A device as covered in claim 1 and the flow of the refrigerant between the first two and second two stages of compression providing the ambient pressure within the semihermetically sealed compressors and the flow of refrigerant between the two sets of two stages being directed across the induction motors to provide cooling action for them.

7. A device as covered in claim 1 and the frequency control means consisting of solid state devices which first rectify power from a single phase power source and then convert it to higher frequency three phase power output suitable for driving the high speed induction motors.

8. A device as covered in claim 7 and means for limiting the starting power drain on the electrical supply line, the said means including a current limiting device inserted in a supply line to the frequency control means for a predetermined time during the starting of the induction motors and centrifugal compressors.

9. A device as covered in claim 1 and means for controlling the speed of the compressors when starting, to prevent excessive boiling of the refrigerant in the evaporator coils before the system has settled down in temperature.

10. A device as covered in claim 1 and means for periodically deicing the heat pump evaporator coil and means for supplying auxiliary heat at the heat pump output during said deicing.

11. A device as covered in claim 1 and means for controlling and regulating the flow of air through the evaporator coil during the heating function to help stabilize and regulate the system operation and prevent undue compressor overloading, the said means being controlled by outside ambient temperature.

12. A device as covered in claim 1 and means for controlling and regulating the flow of air through the condenser coil during cooling function to help stabilize and regulate the system operation and prevent undue compressor overloading, the said means being controlled by condensing or head pressure.

References Cited

UNITED STATES PATENTS

| | | | |
|---|---|---|---|
| 2,786,334 | 3/1957 | Wolf | 62—230 |
| 2,964,923 | 12/1960 | Cone | 62—230 |
| 3,094,850 | 6/1963 | Newton | 62—230 |

MEYER PERLIN, *Primary Examiner.*

U.S. Cl. X.R.

62—183, 194, 228, 505, 510